Nov. 14, 1933.                H. A. KNOX ET AL                1,934,719
                                POWER ACTUATOR
                    Filed May 26, 1931         2 Sheets-Sheet 1
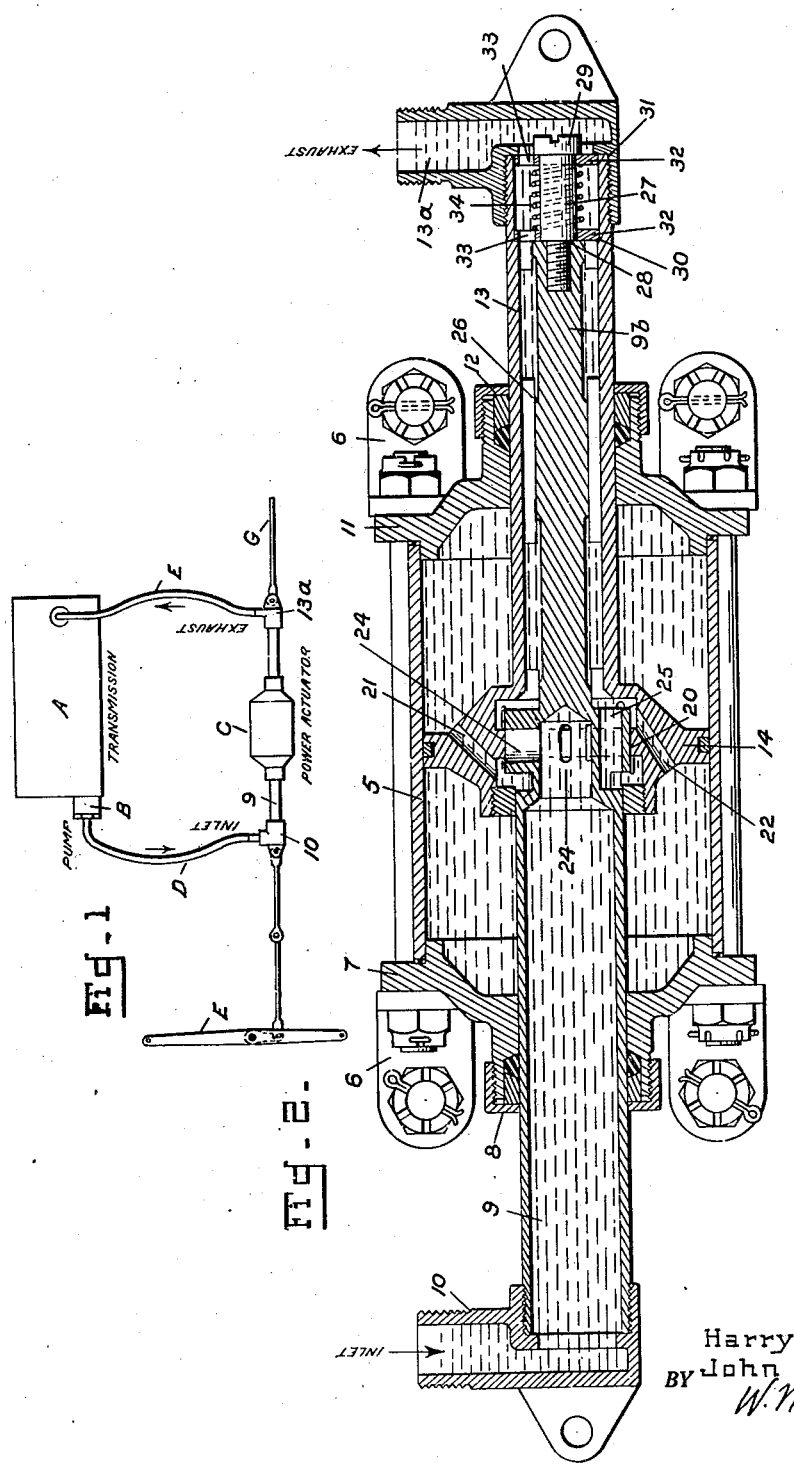
INVENTORS
Harry A. Knox
BY John K. Christmas
W. N. Roach
ATTORNEY

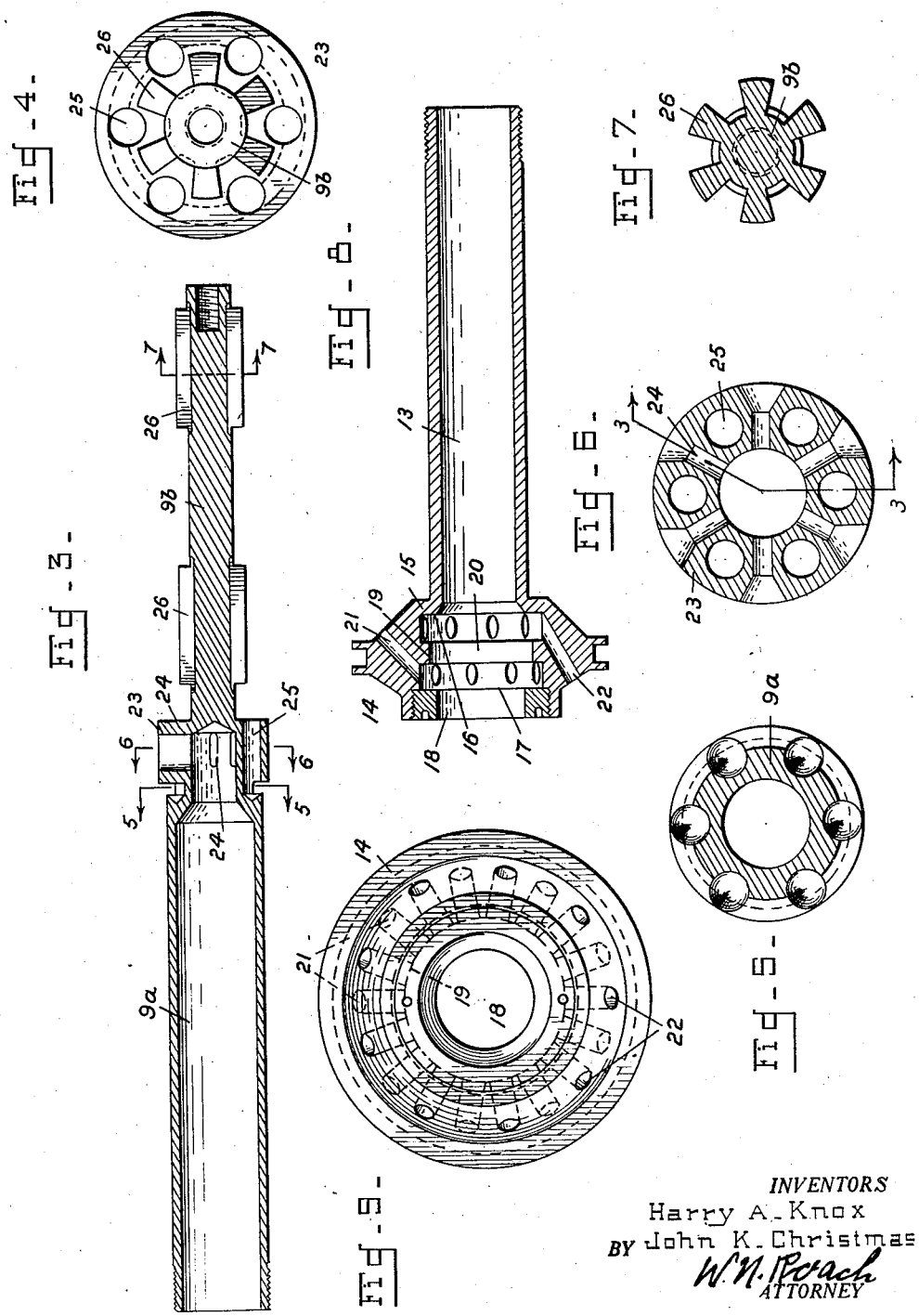

Patented Nov. 14, 1933

1,934,719

UNITED STATES PATENT OFFICE 1,934,719

POWER ACTUATOR

Harry A. Knox, Davenport, Iowa, and John K. Christmas, Easton, Pa.

Application May 26, 1931. Serial No. 540,088

3 Claims. (Cl. 121—41)

(Granted under the act of March 3, 1883, as amended April 30, 1928; 370 O. G. 757)

The invention described herein may be manufactured and used by or for the Government for governmental purposes, without the payment to me of any royalty thereon.

The subject of this invention is a power actuator particularly applicable to brake and steering mechanism of vehicles.

The purpose of the invention is to provide a power actuator that will permit of a small compact arrangement of the component parts, that will be simple in construction and positive in operation and that will require only a single inlet.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a more or less diagrammatical illustration in the nature of a plan view of the complete power actuator.

Fig. 2 is a longitudinal sectional view through the actuator unit.

Fig. 3 is a longitudinal sectional view of the valve rod.

Fig. 4 is an enlarged rear end view of the valve rod.

Figs. 5, 6, and 7 are detail sectional views on the respective lines of Fig. 3.

Fig. 8 is a longitudinal sectional view of the piston.

Fig. 9 is an enlarged front view of the piston.

Referring to Fig. 1 there is shown the change speed transmission and casing A of a vehicle, a pump unit B associated therewith, a power actuator unit C having an inlet line D leading from the pump unit and having an exhaust or return line E leading to the transmission mechanism, and a control mechanism F for the actuator unit.

The actuator unit C shown in detail in Figs. 2 to 9 comprises a cylinder 5 which is to be secured by means of brackes 6—6 to some part of the vehicle frame. The front end plate 7 of the cylinder has a bearing 8 in which is mounted a hollow valve rod 9 carrying a fitting 10 providing for attachment of the inlet line D and for connection with the control mechanism F. The rear end plate 11 of the cylinder has a bearing 12 in which is mounted a tubular piston rod 13 carrying a fitting 13a providing for attachment of the exhaust or return line E and for connection with a link G leading to a brake or steering clutch (not shown).

On the forward or inner end of the piston rod 13 and preferably integral therewith is an annular piston head 14 (Figs. 8 and 9) fitting in the cylinder 5. The piston head is connected to the tubular rod by means of a flange 15 so that its internal diameter is greater than the internal diameter of the rod and also in order that the forward or inside face 16 of the flange may constitute a valve seat. A corresponding and opposite valve face 17 is provided at the forward extremity of the piston head by means of an annular ring 18 threadedly secured thereto.

The piston head is provided between the valve seats 16 and 17 with an internal annular rib 19 whose inner periphery 20 constitutes a fixed central valve seat. On either side of the rib 19 are the entrances of a series of staggered, crossed ports 21 and 22 inclined to the axis of the piston and establishing fluid communication from the interior of the piston to the cylinder on opposite sides of the piston head. The series of ports 21 extend from in front of the rib 19 to the rear face of the piston head while the series of ports 22 extend from in rear of the rib 19 to the front face of the piston head.

Referring now to Figs. 2 to 7 the forward portion 9a of the valve rod 9 is tubular to provide a fluid passage and the rear portion 9b is solid. At the rear extremity of the tubular portion the rod 9 is formed with a collar 23 constituting a slide valve moving within the fixed central valve seat 20 and operating between the end valve seats 16 and 17 to respectively interrupt the passage of fluid through the ports 22 and 21.

The slide valve 23 is provided with a series of spaced, radially disposed outlet ports 24 whose length is in excess of the width of the fixed valve seat 20 so that when the slide valve is in neutral position as shown in Fig. 2 the fluid in the valve rod may be delivered on each side of the fixed valve seat 20 to both of the ports 21 and 22.

Between the radial ports 24 in the valve 23 are longitudinal exhaust passages 25 arranged to establish an outlet communication between the series of ports 21 and the hollow piston rod 13 which conducts the fluid to the return line E.

The solid rear portion 9b of the valve rod includes several sets of radially spaced guide ribs 26 engageable with the wall of the piston rod and serving to center the valve rod.

On the rear extremity of the valve there is an axial pin 27 of less diameter than the diameter of the end of the rod in order to provide a shoulder 28. The outer end of the pin has a head 29 providing an abutment corresponding to the shoulder 28. A shoulder 30 in the piston rod and a shoulder 31 in the fitting 14 are respectively opposite to the shoulder 28 and head 29. A pair of washers 32—32 having apertures 33 for the passage of fluid are held against the complementary shoulders by means of a helical spring 34. This arrangement serves to maintain the relatively movable piston and valve rod in a predetermined positional relation corresponding to the neutral position of the valve 23 as seen in Fig. 2. Upon rearward movement of the valve rod the front washer leaves the shoulder 30 and upon forward movement of the valve rod the rear washer leaves the shoulder 31.

In the normal position of the parts shown in Fig. 2, the control mechanism is in neutral and the slide valve 23 is positioned between the end valve seats 16 and 17. The fluid element, such as oil, with which the device is filled, is then free to be circulated throughout the system without producing any effect on the piston head. The fluid is driven by the pump unit B through the inlet line D and thence by way of the hollow portion of the valve rod through the radial ports 24 in the slide valve 23, and into the cylinder through the ports 21 and 22. The passages 25 provide a return communication for the fluid delivered to the ports 21 while on the opposite side the fluid delivered to the ports 22 has direct communication with the hollow piston rod which conducts the fluid to the return line E whence it is delivered to the transmission casing and after lubricating the gearing therein is available to the pump unit B.

In applying a force that is to be augmented by the power actuator unit, the control mechanism is operated to impart a forward or a rearward movement to the valve rod. Assuming for example that the valve rod is moved forwardly the slide valve 23 is brought up against the front valve face 17 and interrupts communication between the ports 21 and the outlet passage 25. At the same time the ports 24 are displaced relative to the fixed valve 20 so that only the forward end of the ports are unobstructed.

Consequently fluid will be delivered under pressure to the ports 21 and the rear end of the cylinder but the supply to the ports 22 will be interrupted. The ports 22 however are in direct communication with the hollow piston rod and the fluid in the front end of the cylinder may be exhausted as the piston moves forwardly.

The operator of the control mechanism in acting on his control has only to exert sufficient force on the valve rod to maintain the slide valve 23 in the forward position against the action of the spring 34. When the operator discontinues his effort and the movement of the valve rod is arrested the piston unit will continue to move relative to the valve rod and reestablish the neutral balanced position of the slide valve 23. The return to this position is further assured by the spring 34.

The operation during rearward movement of the valve rod is similar to that described for the forward movement. In this instance however the slide valve 23 when moved against the valve seat 16 interrupts the direct return communication between the ports 22 and the hollow piston rod, while the return passage 25 is brought into operative position to exhaust the fluid in the rear end of the cylinder.

When the pump unit is not in operation, either through design or failure, the piston is manually reciprocable upon movement of the valve rod, the connection being effected through the slide valve 23.

We claim.

1. In a power actuator, a cylinder, an annular piston in the cylinder having a hollow piston rod, constituting a fluid exhaust line, staggered crossed ports extending from the interior of the piston to the opposite faces thereof, a fixed central valve seat on the interior of the piston between the ports, end valve seats on the interior of the piston beyond the ports, a hollow valve rod mounted in one end of the cylinder and in the piston rod and movable relative to the piston, said rod constituting a fluid inlet line, a valve on the rod slidable on the fixed central valve seat of the piston between the end valve seats of the piston, radial ports in the slide valve controlled by the fixed central valve seat in establishing communication between the hollow valve rod and the ports in the piston, and longitudinal exhaust passages in the slide valve between the radial ports.

2. In a power actuator, a cylinder, an annular piston in the cylinder having a hollow piston rod, constituting a fluid exhaust line, staggered crossed ports extending from the interior of the piston to the opposite faces thereof, a fixed central valve seat on the interior of the piston between the ports, end valve seats on the interior of the piston beyond the ports, a hollow valve rod movable relative to the piston, said rod constituting a fluid inlet line, a valve on the rod slidable on the fixed central valve seat of the piston between the end valve seats of the piston, radial ports in the slide valve controlled by the fixed central valve seat in establishing communication between the hollow valve rod and the ports in the piston, and longitudinal exhaust passages in the slide valve between the radial ports.

3. In a power actuator, a cylinder, an annular piston in the cylinder having a hollow piston rod, staggered crossed ports extending from the interior of the piston to the opposite faces thereof, a fixed central valve seat on the interior of the piston between the ports, end valve seats on the interior of the piston beyond the ports, a hollow valve rod movable relative to the piston, a valve on the rod slidable on the fixed central valve seat of the piston between the end valve seats of the piston, radial ports in the slide valve controlled by the fixed central valve seat in establishing communication between the hollow valve rod and the ports in the piston, and longitudinal exhaust passages in the slide valve between the radial ports.

HARRY A. KNOX.
JOHN K. CHRISTMAS.